(12) United States Patent
Bernet et al.

(10) Patent No.: US 7,478,161 B2
(45) Date of Patent: Jan. 13, 2009

(54) NETWORK QUALITY OF SERVICE FOR QUALITATIVE APPLICATIONS

(75) Inventors: Yoram Bernet, Seattle, WA (US);
Timothy M. Moore, Bellevue, WA (US);
Ramesh B. Pabbati, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 10/631,203

(22) Filed: Jul. 30, 2003

(65) Prior Publication Data

US 2004/0022191 A1  Feb. 5, 2004

Related U.S. Application Data

(63) Continuation of application No. 09/450,618, filed on Nov. 30, 1999, now abandoned.

(51) Int. Cl.
G06F 15/16 (2006.01)
H04L 1/00 (2006.01)

(52) U.S. Cl. .................. 709/228; 709/220; 709/221; 709/222; 709/226; 709/227; 709/202; 709/203; 709/217; 709/218; 709/219; 709/223; 370/229; 370/230; 370/231; 370/235; 370/236

(58) Field of Classification Search ......... 709/202–203, 709/217–223, 225–229; 370/229–231, 235–236
See application file for complete search history.

(56) References Cited

U.S. PATENT DOCUMENTS 5,903,735 A * 5/1999 Kidder et al. ............... 709/240
6,003,079 A * 12/1999 Friedrich et al. ........... 709/224
6,021,263 A    2/2000 Kujoory et al.
6,154,778 A * 11/2000 Koistinen et al. .......... 709/228
6,463,470 B1 * 10/2002 Mohaban et al. ........... 709/223
6,466,984 B1 * 10/2002 Naveh et al. ............... 709/208
6,487,595 B1 * 11/2002 Turunen et al. ............ 709/226
6,563,793 B1 * 5/2003 Golden et al. .............. 370/236
6,680,943 B1 * 1/2004 Gibson et al. .............. 370/392

(Continued)

OTHER PUBLICATIONS

Gai et al. "RSVP+: An Extension to RSVP," Network Working Group Internet Draft, Jun. 1999.*

(Continued)

*Primary Examiner*—Alina N. Boutah
(74) *Attorney, Agent, or Firm*—Workman Nydegger (57) ABSTRACT

A system and method that enables network quality of service to be based on qualitative factors. RSVP signaling is extended to allow RSVP messages to be identified as qualitative, and to pass qualitative information with the messages. RSVP-aware network devices such as routers in the message path analyze the qualitative information and apply policy based thereon to perform admission control and allocation of resources based on qualitative factors. An application identifier is provided, along with a sub-application identifier that provides fine-grained qualitative information, such as to identify what type of network service an application is requesting. Qualitative signaling may employ RSVP integrated with differentiated services by returning a DCLASS object in an RSVP message, to assign an application's traffic to one or more aggregate classes based on a policy evaluation, which may use qualitative factors against policy for each request. For admitted requests, the application's host machine or an upstream sender may mark the packets with the appropriate aggregate classification information, whereby packets are then prioritized accordingly in the network.

42 Claims, 8 Drawing Sheets

U.S. PATENT DOCUMENTS

| | | | |
|---|---|---|---|
| 6,721,272 B1* | 4/2004 | Parnafes et al. | 370/235 |
| 6,771,661 B1* | 8/2004 | Chawla et al. | 370/468 |
| 6,788,647 B1* | 9/2004 | Mohaban et al. | 370/235 |
| 6,801,939 B1* | 10/2004 | Chafe | 709/224 |
| 6,957,255 B1* | 10/2005 | Schweitzer et al. | 709/223 |
| 7,106,756 B1* | 9/2006 | Donovan et al. | 370/468 |
| 7,154,858 B1* | 12/2006 | Zhang et al. | 370/252 |
| 7,346,677 B1* | 3/2008 | Mohaban et al. | 709/224 |
| 2003/0076838 A1* | 4/2003 | Shaio et al. | 370/395.5 |

OTHER PUBLICATIONS

Viswanathan et al. "Soft State Swtiching A Proposal to Extend RSVP for Switching RSVP for Switching RSVP Flows," Internet-Draft, Mar. 1997.*

Berger et al. "RSVP Extensions for IPSEC Data Flows," Network Working Group RFC 2207, Sep. 1997.*

Bernet, Y.; Stewart, J.; Yavatkar, R.; Anderson, D.; Tai, C.; Quinn, B.; and Lee, K. Windows Networking Grouping: Winsock Generic QOS Mapping (draft). Version 3.1 Sep. 21, 1998.

Blake, S. et al., "An Architecture for Differentiated Services", *Network Working Group Request for Comments: 2475*, pp. 1-37 (Dec. 1998) http://www.sunsite.auc.dk/RFC/rfc/rfc2475.html printed Oct. 13, 1999.

Braden, R., et al., "Resource ReSerVation Protocol (RSVP)", *Network Working Group Request for Comments: 2205*, Version 1, pp. 1-97 (Sep. 1997) http://www.kashpureff.org/nic/rfcs/2200.txt.html printed Oct. 13, 1999.

Bradner, S., "Key Words for Use in RFCs to Indicate Requirement levels", *Network Working Group Request for Comments: 2119*, pp. 1-3 (Mar. 1997), http://www.kashpureff.org/nic/rfcs/2100/rfc2119.txt.html printed Oct. 13, 1999.

Kille, S., "A String Representation of Distinguished Names", *Network Working Group Request for Comments: 1779*, pp. 1-8 (Mar. 1995), http://hotline.pvtnet.cz/dokumentace/rfc/rfc1779.html printed Oct. 13, 1999.

Microsoft White Paper: "Enabling Quality of Service Windows Sockets-Based Mission Critial Applications." May 20, 1999. <http://www.microsoft.com/windows2000/techinfo/howitworks/communications/trafficmgmt/enablingqos.asp>.

Shenker, S., "Network Element Service Specification Template", *Network Working Group Request for Comments: 2216*, pp. 1-20 (Sep. 1997), http://www.kashpureff.org/nic/rfcs/2200/rfc2216.txt.html printed Oct. 13, 1999.

Wroclawski, J., "The Use of RSVP with IETF Integrated Services", *Network Working Group for Comments: 2210*, pp. 1-29 (Sep. 1997), http://www.kashpureff.org/nic/rfcs/2200/rfc2210.txt.html printed Oct. 13, 1999.

"Specification of the Qualitative Service Type", T. Moore, Microsoft, Feb. 1999.

* cited by examiner

NETWORK QUALITY OF SERVICE FOR QUALITATIVE APPLICATIONS

CROSS-REFERENCE TO RELATED APPLICATION

This application is a continuation of copending U.S. patent application Ser. No. 09/450,618 filed Nov. 30, 1999.

FIELD OF THE INVENTION

The present invention is directed generally to computer networks, and more particularly to network traffic management.

BACKGROUND OF THE INVENTION

Networks interconnect hosts using a variety of network devices, including host network adapters, routers, switches and hubs, each of which include network interfaces for interconnecting the various devices via cables and fibers. Applications send data over a network by submitting it to an operating system, after which it becomes network traffic. Network devices generally use a combination of hardware and software to forward network traffic from one network interface to another. Each interface can send and receive network traffic at a finite rate, and if the rate at which traffic is directed to a network interface exceeds the rate at which the network interface can forward the traffic onward, congestion occurs. Network devices may handle this condition by queuing traffic in the device's memory until the congestion subsides. In other cases, network equipment may discard some excess traffic to alleviate congestion.

As a result, applications sending network data experience varying latency or traffic loss. Applications generate traffic at varying rates and generally require that the network be able to carry traffic at the rate at which they generate it. In addition, applications differ in how tolerant they are of traffic delays in the network, and of variation in traffic delay. For example, certain applications can tolerate some degree of traffic loss, while others cannot. As a result, different applications have different requirements regarding the handling of their traffic in the network.

Network Quality of Service (QoS) refers to the ability of the network to handle network traffic such that it meets the service needs of certain applications. To this end, network QoS requires fundamental traffic handling mechanisms in the network, the ability to identify traffic that is entitled to these mechanisms and the ability to control these mechanisms. The fundamental traffic handling mechanisms that comprise a QoS enabled network include the capacity of interfaces to forward traffic, the memory available to store traffic in network devices, (until it can be forwarded), and mechanisms internal to network devices that determine which traffic gets preferential access to these resources. The requirements of applications for handling of their traffic are expressed using the QoS related parameters of bandwidth—the rate at which an application's traffic must be carried by the network; latency—the delay that an application can tolerate in delivering a packet of data; jitter—the variation in latency; and loss—the percentage of lost data.

Because network resources are finite, there are parts of the network wherein resources are unable to meet demand. QoS mechanisms work by controlling the allocation of network resources to application traffic in a manner that meets the application's service requirements. Devices that provide QoS support do so by intelligently allocating resources to submitted traffic. For example, under congestion, a network device might choose to queue traffic of applications that are more latency tolerant (or did not specify their latency tolerance to the network) instead of traffic of applications that are less latency tolerant. As a result, the traffic of applications that are less latency tolerant can be forwarded immediately to the next network device. In this example, interface capacity is a resource which is granted to the latency-intolerant traffic, while device memory is a resource that has been granted to the latency-tolerant traffic.

In order to allot resources preferentially to certain traffic, it is necessary to identify different traffic and to associate it with the resources it requires. This is accomplished by recognizing separate traffic flows within the network and by defining traffic handling parameters which apply to these flows. Devices identify packets as belonging to one flow or another. In order to invoke QoS mechanisms, it is necessary to communicate to network devices the information necessary to associate packets with flows, and a description of the handling that should apply to traffic on each flow. This is achieved through various signaling means and device configuration.

One QoS signaling protocol is RSVP (Resource Reservation Protocol), which works over TCP/IP. RSVP applications can use RSVP messages to request quality of service from the network and to indicate QoS requirements to the network and to peer applications. RSVP is suited for use with IP (Internet Protocol) traffic. As currently defined, RSVP uses Integrated Services (Intserv) semantics to convey its QoS requirements to the network. Since RSVP operates at a layer above TCP/IP, it is largely independent of the various underlying network media over which it operates. Therefore, RSVP can be considered an abstraction layer between applications (or the operating system) and media-specific QoS mechanisms.

RSVP messages follow the path of the traffic for which resources are being requested, whereby messages arrive at the devices whose resources will be utilized by a successful reservation, i.e., by admission of a flow. This provides admission control based on the current resources available in the affected devices, that is, RSVP-aware devices understand the applicability of RSVP requests to their specific media, and are able to accept or reject the messages based on their resources and ability to support the requests. This end-to-end nature of admission control contrasts with top-down QoS mechanisms, which assign resources (or admit flows) based on statistics and heuristics of anticipated traffic paths.

Standard RSVP messages typically carry a quantitative description of the relevant QoS traffic in parameters referred to as token-bucket parameters (in Intserv semantics). Traffic generated by multimedia applications can easily be quantified in this manner. Another aspect of RSVP is that it is oriented towards relatively long-lived flows, as RSVP effectively signals to set up a 'circuit' between sender and receiver. There is inherent overhead in this process, and as a result, RSVP is better suited for 'session-oriented' applications that exchange QoS data between fixed endpoints, and less suited for applications that exchange bursts of data between frequently changing endpoints (such as web browsing). Thus, for example, RSVP, using the standard token-bucket model of Intserv, is well suited to multimedia applications such as IP telephony and video serving, which tend to generate relatively long-lived flows with easily quantifiable traffic patterns.

However, standard RSVP/Intserv is not suitable for other types of applications that are unable to quantify the resources they require from the network. Such "qualitative applications" include, for example, ERP or database applications, such as SAP, SQL server accesses and transaction processing applications. Such applications tend to generate sporadic bursts of traffic that are difficult to quantify in a manner that is useful for admission control. Since the required resources cannot be quantified, network nodes cannot determine whether sufficient resources exist to accommodate an application's traffic and standard Intserv style admission control cannot be applied. As a result, such programs cannot benefit from the existing QoS mechanisms that are centered on quantitative-based parameters.

SUMMARY OF THE INVENTION

Briefly, the present invention provides a system and method that enables quality of service to be based on qualitative factors. To this end, RSVP signaling is extended to allow RSVP messages to be identified as qualitative, and to pass qualitative information with the RSVP messages. RSVP-aware network devices such as routers and switches (and attached policy management systems) in the message path analyze the qualitative information and apply policy based thereon to perform admission control and allocation of resources based on qualitative factors. Network resources may be granted or denied based on an evaluation of this qualitative information against some administrator-defined policy rules, for example, based on the relative importance of the application and/or the particular type of operation pending, the typical pattern or type of data for which the application is requesting resources, and so forth.

A sub-application flow identifier may be used to provide finer-grained qualitative information, such as to identify what type of action an application is requesting. For example, transaction processing, database retrieval operations and print data requests may all be requested by the same application, yet require different network resources (or affect the network resources in different ways). The sub-application identifier provides the network devices with additional, finer-grained information about an application's request (that may not be available by alternate means) so that the device may make a more informed policy decision on admitting or denying the request, and regarding the resources which will be allotted to the corresponding traffic in network devices relative to other network traffic.

The present invention also provides a mechanism for aggregating flows of qualitative applications by integrating RSVP and differentiated services (diff-serv) via a DCLASS object returned in an RSVP message. The DCLASS object includes a diff-serv codepoint (DSCP). This indicates to upstream senders how they should classify and mark transmitted packets on the corresponding traffic flow in order to prioritize the application's traffic. Selection of the DSCP for placing in the DCLASS object is based on a policy evaluation, which may evaluate qualitative factors against policy for each request. For admitted requests, the application's host machine, or any upstream sender, may mark the packets with the appropriate aggregate class information via the DSCP. Packets are then regulated according to the DCSP, by diff-serv capable routers, for example, which also may change the way in which packets are marked.

Other advantages will become apparent from the following detailed description when taken in conjunction with the drawings, in which:

DETAILED DESCRIPTION OF THE INVENTION

Exemplary Operating Environment

Figure 1:
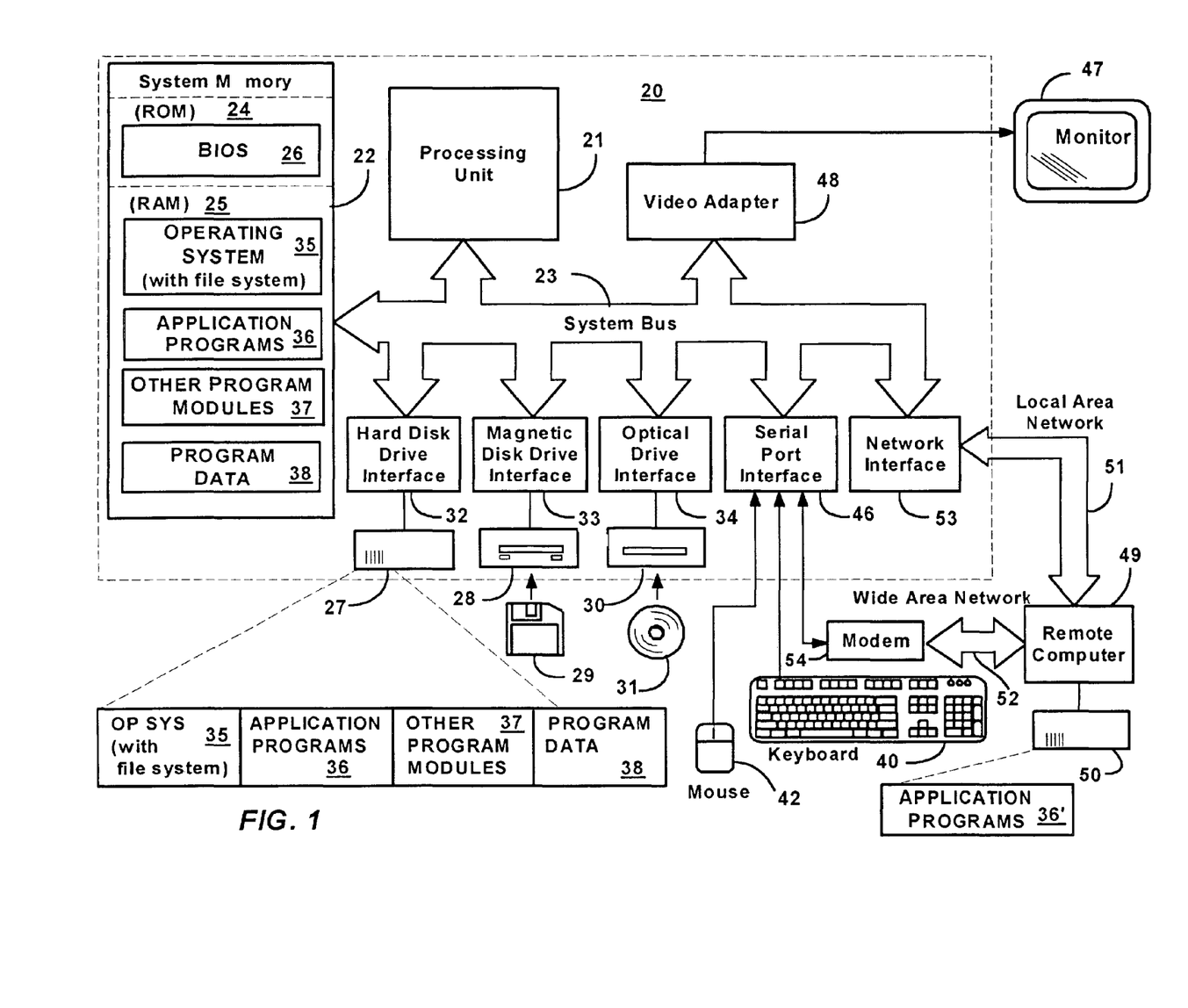
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data and programs that are accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Standard Quantitative RSVP/Intserv Signaling

Figure 2:
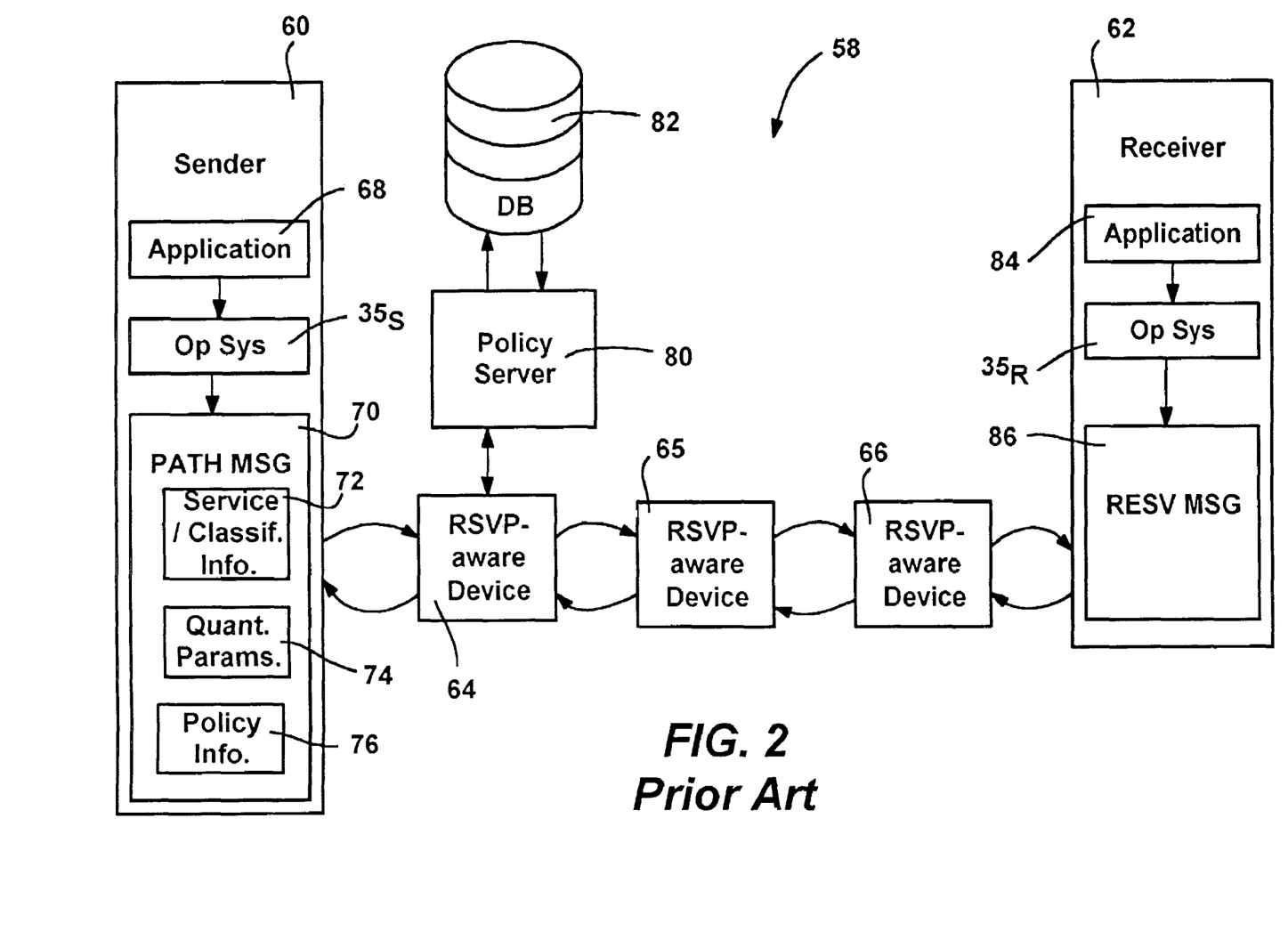
FIG. 2 is a block diagram representing an RSVP network and PATH and RESV messages for quantitative signaling according to the prior art.

By way of background, as represented in FIG. 2, in traditional quantitative RSVP/Intserv message signaling, the information exchanged is per-flow information, wherein a "flow" in RSVP refers to a particular conversation between two endpoints in a network 58, such as a sender (transmitter) node 60 and receiver node 62. RSVP/Intserv messages carry very specific classification information, which enables RSVP-aware devices (e.g., 64-66) in the network to separate traffic into flows associated with individual conversations and to assure that each flow gets the treatment agreed to by the approval of the RSVP/Intserv request. An advantage of such a "fine-grain" classification is that rogue traffic flows cannot steal resources from legitimate traffic flows, either accidentally or maliciously. A disadvantage of fine-grain classification is that network devices are required to maintain more state and to apply more processing power than would be required in the case of coarser-grain classification.

Two significant RSVP messages are PATH and RESV. As generally represented in FIG. 2, in RSVP signaling, an application 68 (via the operating system $35_s$) on the sender node 60 sends a PATH message 70 to describe the data the application will be transmitting to follow the path that the data will take. The path to the receiver 62 is typically through network devices, such as the devices 64-66, which are typically (but not necessarily) routers or switches. RSVP-aware devices 64-66 in the data path intercept the PATH messages, and for RSVP/Intserv signaling information in the PATH message, establish state for the flow described by the message 70.

Standard RSVP/Intserv messages carry information 72 specifying the service level required from the network 58 for the flow, along with classification information specifying how the network 58 can identify traffic flow, quantitative parameters 74 describing the traffic on the flow, (e.g., data rate, and so forth), and policy information 76 (e.g., who is requesting resources for the flow). Classification information is conveyed using IP source and destination addresses and ports, while a service level is specified from a set of Intserv defined service types. Quantitative traffic parameters 74 are expressed using a token-bucket model specified by Intserv. Policy information 76 typically contains information identifying the user requesting resources, which may be used to subject the request to policy tests in order to verify (e.g., to a policy server 80 with a policy database 82) that the requester is entitled to the requested resources.

In quantitative RSVP signaling, when the PATH message 70 arrives at the receiver 62, if a receiving application 84 is interested in the traffic flow offered by the sender node 60, the receiver 62 responds with a RESV message 86. The RESV message 86 winds its way back towards the sender 60, following the path established by the incident PATH message 70. As the returned RESV message 86 progresses toward the sender 60, each RSVP-aware device (e.g., the router 66) verifies that it has the resources necessary to meet the requested QoS quantitative requirements. If the device does, the RESV message 86 is allowed to progress further. If it does not, the RESV message 86 is rejected and a rejection is sent back to the receiver 62. In addition, RSVP-aware devices (e.g., 64) in the data path may extract policy information from PATH messages and/or RESV messages, e.g., for verification via the policy server 80 against network policies stored in the policy database 82. The device 64 may thus reject resource requests based on the results of such policy checks by preventing the message from continuing on its path, and sending a rejection message.

When requests are neither rejected for resource unavailability nor for policy reasons, the incident PATH message 70 is carried from the sender 60 to the receiver 62, and the RESV message 86 is carried from the receiver 62 to the sender 60. In this event, a reservation is referred to as an installed reservation. An installed reservation indicates that the RSVP-aware devices 64-66 in the traffic path have committed the requested resources to the appropriate flow and are prepared to allocate these resources to traffic belonging to the flow. This process, of approving or rejecting RSVP messages is known as admission-control. When a resource request is admitted, network nodes install classifiers that are used to recognize the admitted traffic and policers that are used to assure that the traffic remains within the limits of the resources requested. This works well for quantitative applications such as IP telephony and applications communicating video information because it is easy to quantify the resources needed to handle the amount of data. However, in making a reservation, a significant amount of state is thus required in the networking devices in the path to support the per-flow traffic handling used in quantitative signaling.

Qualitative RSVP Signaling

In accordance with one aspect of the present invention, signaling for network quality of service QoS has been extended to carry qualitative information. Network QoS for qualitative applications is provided to enable network devices to prioritize and otherwise manage applications that cannot readily quantify the resources they require from the network. Thus, in contrast to quantitative services, which reserve a specific quantity of resources, QoS for qualitative resources attempts to optimize the use of available resources without quantifiable reservations. Instead, the application uses RSVP/QoS signaling to identify itself and the type of operation it is requesting, and defers to the network to prioritize it in some manner relative to other traffic, based on a policy evaluation of the various qualitative data provided to the network. One way in which qualitative traffic may be prioritized based on the policy evaluation is to classify it into one of a limited number of classes, whereby an aggregate traffic handling mechanism implemented in the intermediate network devices may prioritize the application's packets relative to other packets, as described below.

Figure 3:
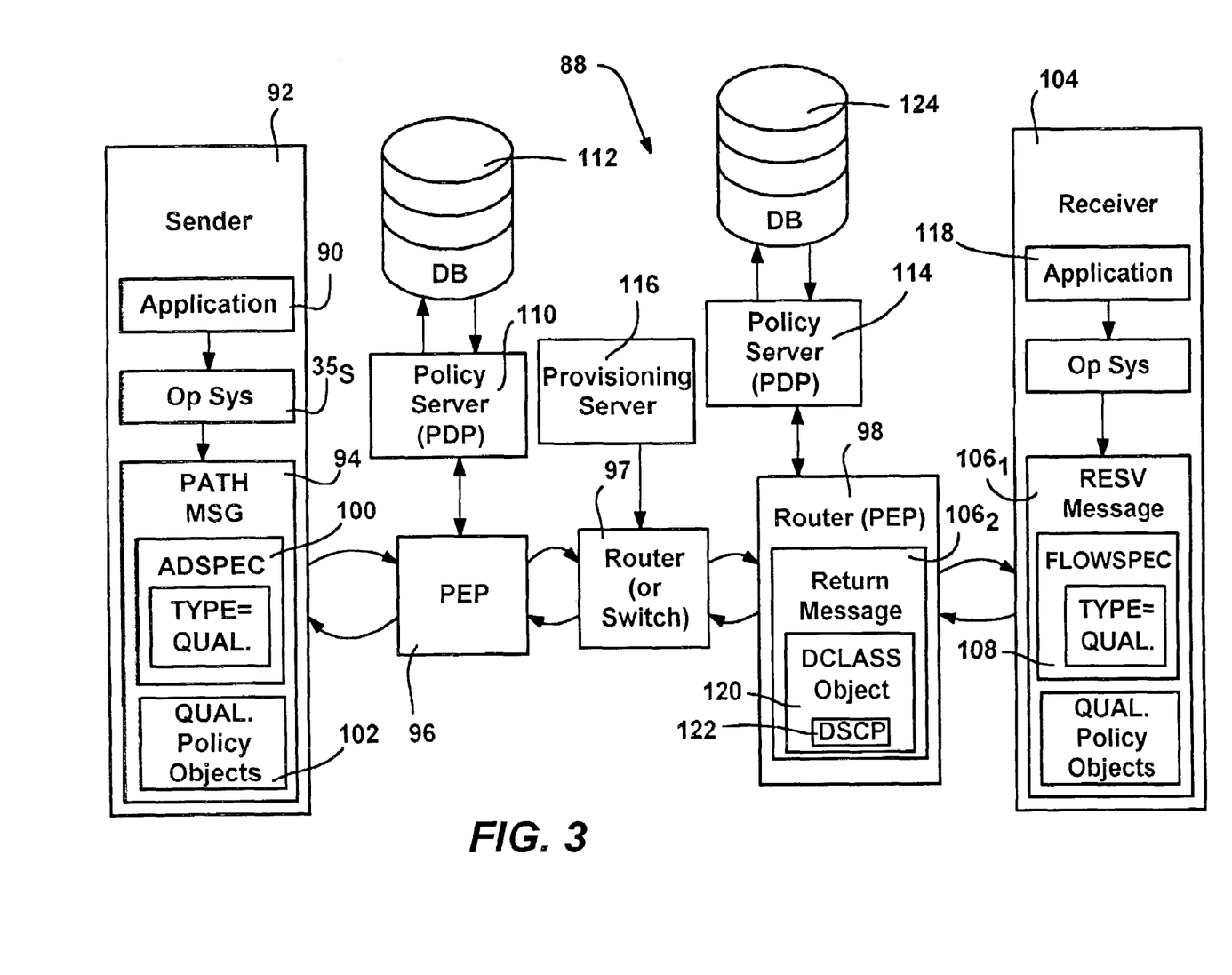
FIG. 3 is a block diagram representing an RSVP/diff-serv network wherein a DCLASS object is added to an RSVP qualitative return message in accordance with one aspect of the present invention.

To obtain qualitative QoS in a network 88 using RSVP signaling, as represented in FIG. 3, an application 90 on a sending host 92 issues a request for network services (via a Winsock2 Application Programming Interface (API) call to the operating system 35$_s$) to send a qualitative request 94 (in a PATH message). In keeping with the present invention, the RSVP protocol has been extended for requesting qualitative services, such that the request includes the type of service requested, the name or identity of the application, and the name or identity of a sub flow of the application.

Using the information provided by the application 90, the operating system 35$_s$ composes the RSVP request message 94, and therein provides an object or the like including the user identity (e.g., Kerberos encrypted) and other information (e.g., IP addresses and ports) by which the relevant traffic flow can be recognized by network devices 96-98.

Figure 4:
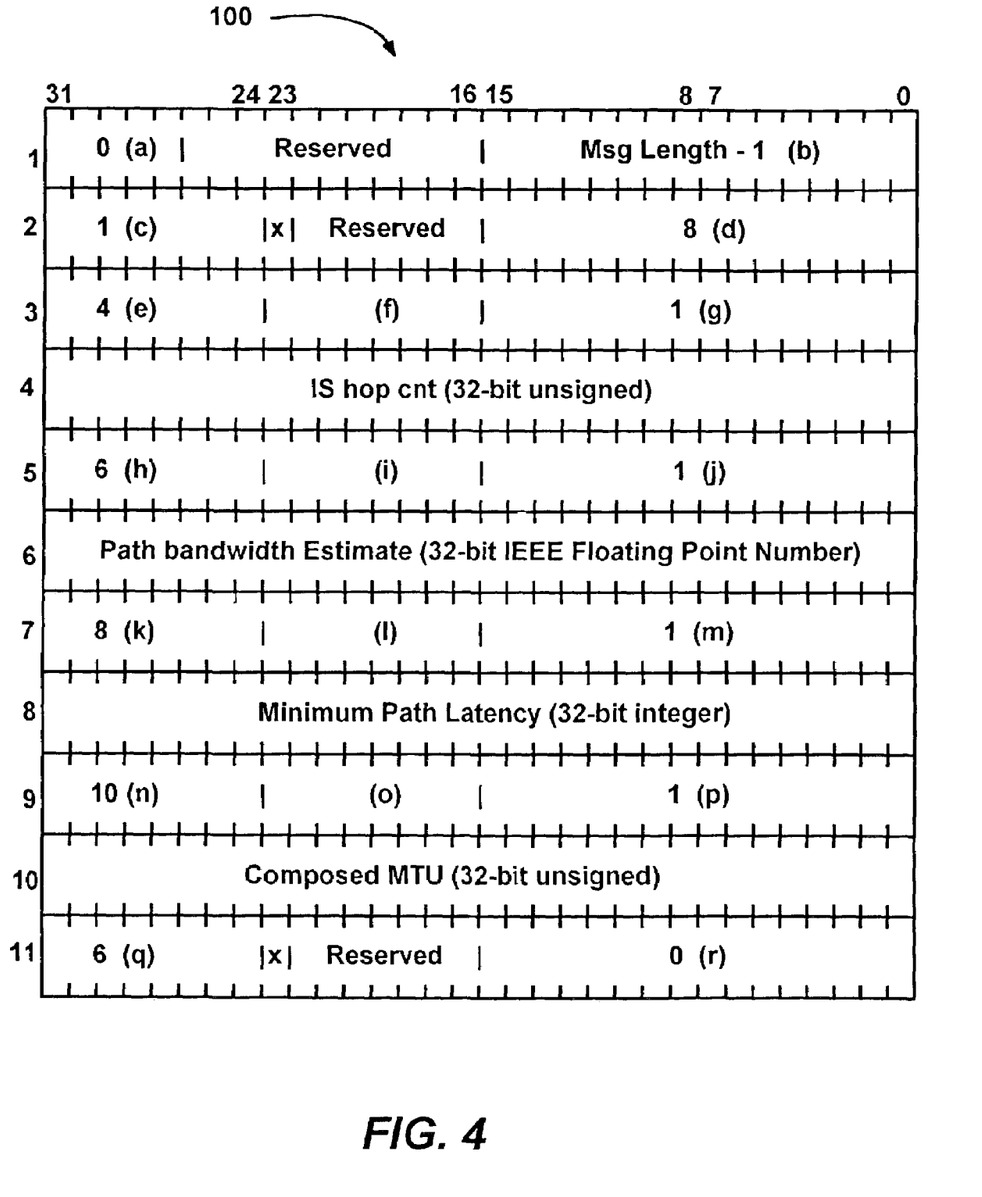
FIG. 4 is a representation of a data structure used for qualitative signaling in RSVP messages in accordance with one aspect of the present invention.
Figure 5:
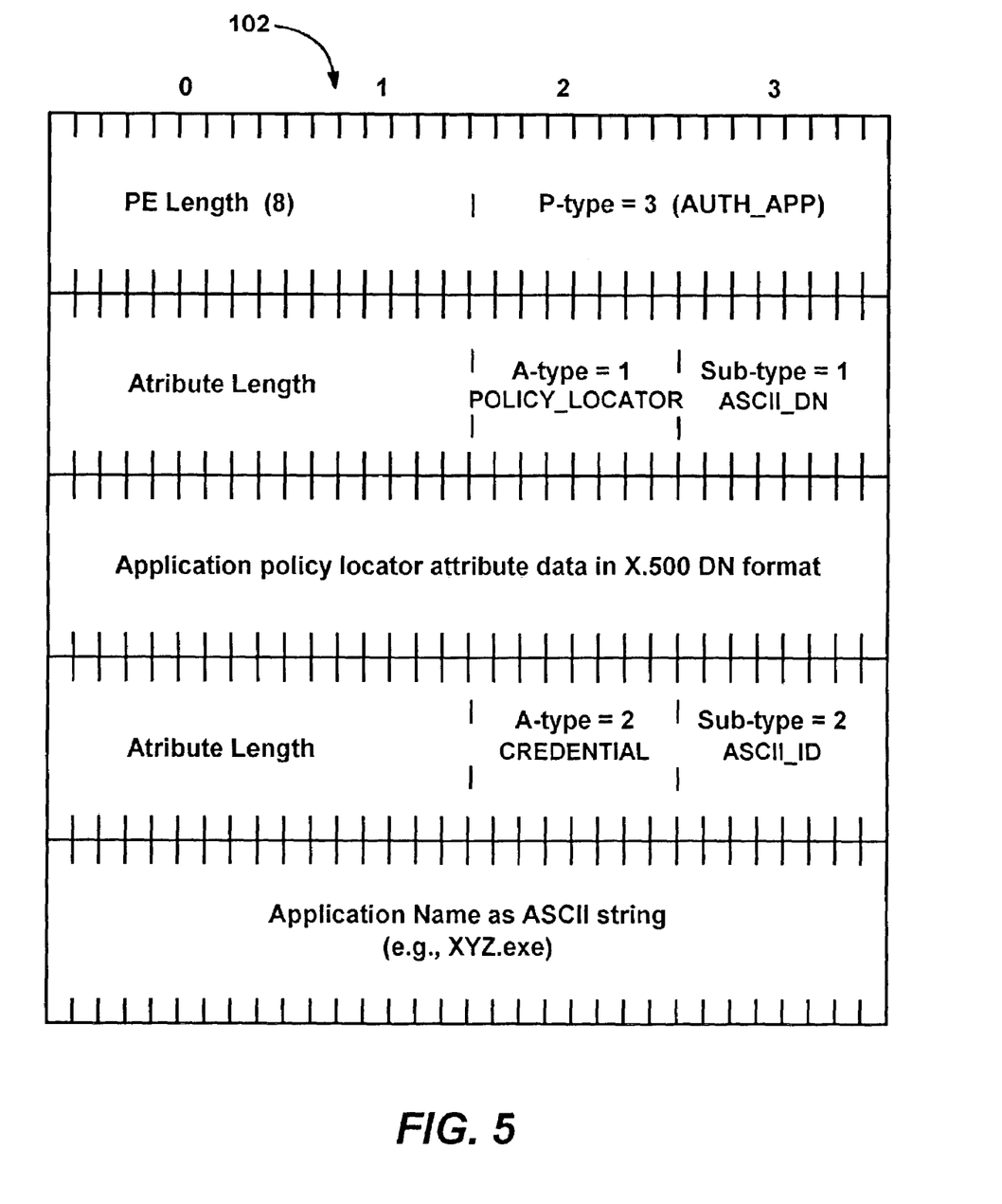
FIG. 5 is a representation of a data structure used for communicating qualitative parameters in RSVP messages in accordance with one aspect of the present invention.
Figure 6:
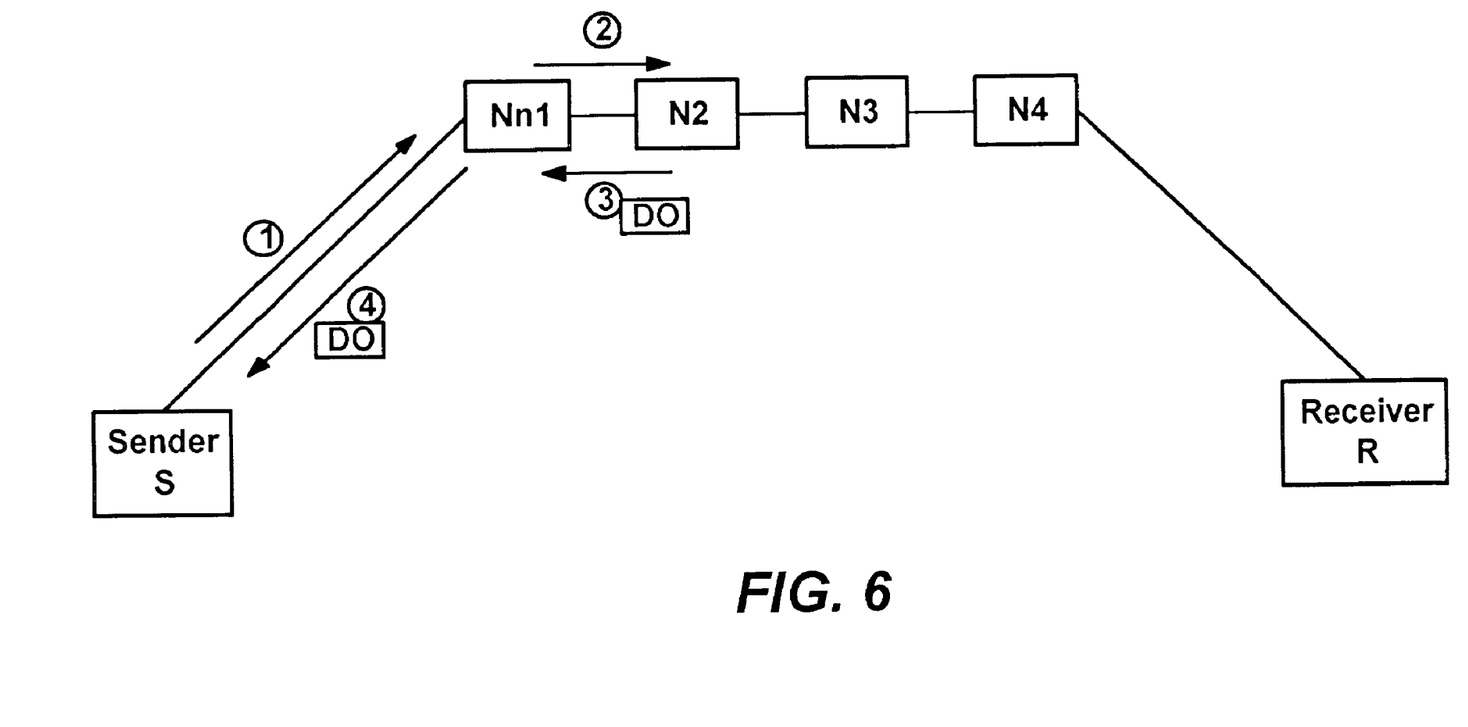
FIG. 6 is a block diagram representing an RSVP/diff-serv network wherein an RSVP message is intercepted by a network node and a DCLASS object returned thereby to the sender.

Various details for accomplishing qualitative signaling in RSVP are generally represented in FIGS. 4-6. As shown in FIG. 4, an RSVP sender (e.g., the sender 92 of FIG. 3) constructs an initial RSVP ADSPEC object 100 specifying Service Type Qualitative in DWORD eleven (11), (wherein in FIG. 4, the DWORDS are numbered from one (1) to eleven (11) down the left side of the object representation 100). Note that service type qualitative may also be specified in DWORD two (2). Also constructed is one or more policy object data structures, including an object 102 (FIG. 5) or the like that provides qualitative parameters.

As represented in FIG. 4, the RSVP ADSPEC object 100 for Qualitative Service Type includes a message header and a default general parameters fragment, followed by a single fragment denoting Service Type Qualitative. The following TABLE 1 corresponds to the ADSPEC object 100 of FIG. 4 and sets forth a substantially complete ADSPEC supporting (only) Service Type Qualitative:

TABLE 1

| | |
|---|---|
| Dword 1: Message Header | (a) Message header and version number |
| | (b) Message length—10 words not including header |
| Dwords 2-10: Default general characterization parameters | (c)—Per-Service header, service number 1 (general) |
| | (x)—Global Break bit (NON_IS_HOP general parameter 2) |
| | (d)—Length of General Parameters data block (8 words) |
| | (e)—Parameter ID, parameter 4 (NUMBER_OF_IS_HOPS general parameter) |
| | (f)—Parameter 4 flag byte |
| | (g)—Parameter 4 length, 1 word not including header |
| | (h)—Parameter ID, parameter 6 (AVAILABLE_PATH_BANDWIDTH general parameter) |
| | (i)—Parameter 6 flag byte |
| | (j)—Parameter 6 length, 1 word not including header |
| | (k)—Parameter ID, parameter 8 (MINIMUM_PATH_LATENCY general parameter) |
| | (l)—Parameter 8 flag byte |
| | (m)—Parameter 8 length, 1 word not including header |
| | (n)—Parameter ID, parameter 10 (PATH_MTU general parameter) |
| | (o)—Parameter 10 flag byte |
| | (p)—Parameter 10 length, 1 word not including header |
| Dword 11: Qualitative parameters | (q)—Per-Service header, service number 6 (Qualitative) |
| | (x)—Break bit for Service Type Qualitative |
| | (r)—Length (0) of per-service data not including header word. |

Since ordinarily there are no service specific parameters associated with the qualitative service type, the associated ADSPEC fragment is empty and contains only the header word. Network nodes may or may not supply valid values for bandwidth and latency general parameters. As such, they may use previously defined default/unknown values.

Note that standard RSVP rules for parsing ADSPEC service fragments ensure that the ADSPEC will not be rejected by legacy network elements. More particularly, these rules state that a network element encountering a per-service data header which it does not understand should set a break-bit to indicate that the service is not supported and should use the length field from the header to skip over the rest of the fragment. Also, note that it is likely that it will not be possible for hosts or network nodes to generate meaningful values for DWORDS 5 and/or 7 (bandwidth estimates and path latency), due to the qualitative nature of the service. In this event, defined default/unknown values should be used.

In accordance with another aspect of the present invention, and, as represented in FIG. 5, the RSVP sender 92 also includes with the qualitative request message 94 the object 102 providing qualitative parameters including application and sub-application identifier information. The application identifier enables network administrators to manage QoS based on application type, for example, to establish a policy that prioritizes certain applications (e.g., payroll) over others (e.g., games).

Moreover, in the object 102, additional finer-grained application-related information beyond that of application identifier may be provided in a qualitative service-type message. To this end, in one implementation, a hierarchical structure is provided for the attributes carried in the application policy elements. More particularly, the highest level of the hierarchy specifies the application name (identifier), and the next level specifies a version. At the next level or levels, an arbitrary number of sub-application attributes may be specified as represented in FIG. 5. These sub-application identifiers provide finer-grained information that may be used to determine policy.

By way of example, a sub-application identifier may inform a policy server 80 (admission control element) as to the type of operation to which it corresponds, e.g., a database retrieval request, a transaction processing request, a request to print data, and so forth. Based on this information, the policy server 80 may make an informed policy decision on whether it can allow the request, and/or how to classify and prioritize the request relative to others, particularly other qualitative requests. For example, print data requests can generally be handled in a low priority, high latency way, whereas a transaction processing request may time out at the application if delayed too long. Thus, using one or more sub-application identifiers, a well-behaved application can specify the operation it is requesting, whereby the policy server 80 can admit or deny the request, and if admitted, determine an aggregate classification for it, as described below. Using the above example, if the network is highly congested, the network device may be able to queue a print request, but will have to deny (or highly prioritize) transaction processing requests. As can be appreciated, other factors such as the user identity and/or the application identity may be used to determine whether to deny or highly prioritize among transaction processing requests.

Sub-application identifiers may be application dependent, that is, each application identifier has a number of sub-application identifiers associated therewith that each have a meaning only with respect to that application. Other sub-application identifiers may be global across applications, i.e., application independent, for example, by having some value that means the same thing regardless of which application is sending the request. For example, 'print data' has a meaning that many applications could share, and thus is a suitable candidate for a application-independent sub-application identifier.

FIG. 5 shows how this application information is put into policy element information inside a qualitative message. Generally, application policy elements have a policy elements type (P-type) of AUTH_APP (value 3). Following the policy element header is a list of authentication attributes. The first authentication attribute should be of the A-type POLICY_LOCATOR (value 1), and the sub-type should be of type ASCII_DN (value 1). The actual attribute value is formatted as an X.500 distinguished name (DN), representing the application name, version number and sub-application attributes. The second authentication attribute should be of the A-type CREDENTIAL (value 2). The sub-type of the CREDENTIAL attribute is of type ASCII_ID. The actual attribute value is an ASCII string representing the application name, (e.g., XYZ.exe) as shown in FIG. 5.

In one implementation, the policy locator attribute for an application policy element uses the string "APP" for the application name, "VER" for the application version number and "SAPP" for the Sub-Application identifier. For example, "APP=SAP, VER=1.1, SAPP=Print" is a policy locator that is conformant to this naming convention.

It should be noted that the simple policy element does not guarantee that the element is indeed associated with the application to which it claims to be associated. In order to provide such guarantees, it is necessary to sign applications. Note that typically, the application policy element will be included in an RSVP message with an encrypted and authenticated user identity policy element. Thus, a level of security is provided by trusting the application policy element only if the user policy element is trusted. RSVP integrity considerations apply to the message containing the application policy element.

Returning to FIG. 3, the ADSPEC object 100 is added to the RSVP qualitative request message 94 created at the sender 92. When composed, the RSVP qualitative request message 94 is sent by the sender 92 towards the receiver 104. An admission control agent (Policy Enforcement Point, or PEP) 96 in the network 88 intercepts the message and extracts information describing the requesting user, the requesting application, and the requested service. Note that as described below, an RSVP message comprising qualitative information may also include a request for quantitative services, in which event the message will also include the quantity of resources required, which the PEP 96 will also obtain. Each PEP and (optionally) a policy decision point (PDP) 110 connected thereto may use this information to locate and process a network policy (e.g., in a data store 112) that should be applied to the flow described. Note that information from the PDP 110 is typically cached in the PEP 96 to optimize performance.

If the RSVP qualitative request message 94 is admitted by the PEP 110, the RSVP message may continue along its path towards the receiver 104, where additional PEPs/PDPs (e.g., 98 and 114) may process it for admission or rejection. If the RSVP message 94 is not admitted, the PEP that denies admittance sends a rejection back towards the sending host 92, and the sending application 90 is notified of the rejection. Thus, in general, PEPs, in conjunction with PDPs, extract policy information from RSVP qualitative signaling requests and compare the information against information stored in a policy database or directory. A policy decision is made based on the results of the comparison.

Instead of (or in addition to) applying policy, intermediate nodes (e.g., 97) may report the message information to a top-down provisioning server 116 or the like. This signaling enables qualitative applications to be dynamically considered with others and the network topology when administering the network and allocating resources. For example, an administrator can evaluate how many qualitative flows are going through each node, and limit resources accordingly, in real-time, top-down provisioning.

If admitted by each network node, the qualitative request message 94 reaches the receiver 104, which may respond by sending an RSVP qualitative return message $106_1$ (a RESV message) back towards the sender containing a FLOWSPEC object 108 that also specifies that it is requesting Service Type Qualitative. It should be noted however, that a qualitative request message 94 need not reach the receiver 104 in order for the sending application 90 to take advantage of network Qos. Instead, as represented in FIG. 6, a node (e.g., one of the PEPs) may act as a proxy and return a RESV message to the sender, not as a rejection, but as the return message, along with additional information (e.g., a DCLASS object, also described below) that facilitates QoS for the qualitative application 90. For example, as represented in FIG. 6, a sender S may send a qualitative request (shown via the arrow labeled with circled numeral one) which is passed through a first node N1 (arrow labeled two), but is terminated by the node N2. The node N2 adds a DCLASS object DO (e.g., in accordance with some applicable policy) and returns the DCLASS object DO to the sender S via the first node N1 (arrows labeled three and four). As described below, DCLASS object is used for classifying flows for aggregate traffic handling thereof. The sender S thus receives a response without the receiver R or nodes beyond the node N2 ever being involved. Advantages of this include a relatively quick response to the sender 92, and also that the receiver's application 118/operating system $35_R$ need not be capable of returning an RSVP signaling message to the sender 92. A disadvantage is that network topology awareness is lost by not communicating over the full path, losing or at least compromising the ability to perform real-time, top-down provisioning, whereby there can be no reliable guarantee of service over the entire path.

Figure 7:
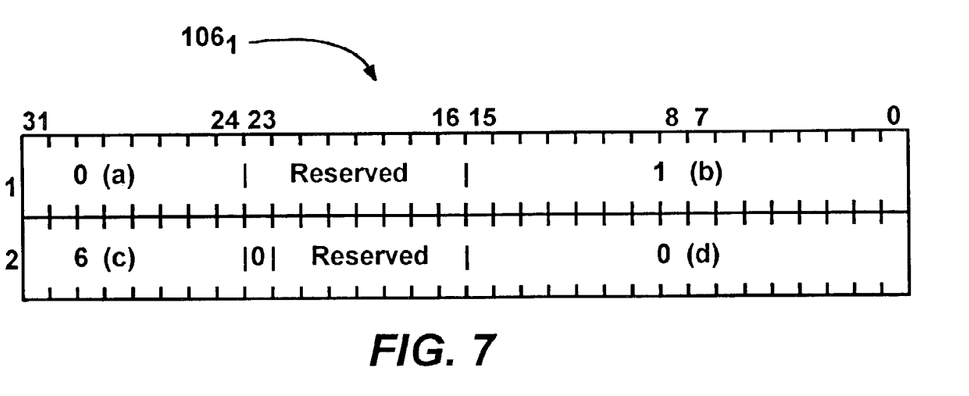
FIG. 7 is a representation of a data structure used for qualitative signaling in returned RSVP messages in accordance with one aspect of the present invention.

The format of an RSVP FLOWSPEC object 108 (e.g., originating at the receiver 104 or a intermediate node acting as a proxy) requesting Qualitative service is shown in FIG. 7 and in TABLE 2 below:

TABLE 2

| | |
|---|---|
| Word 1 | (a)—Message format version number (0) |
| | (b)—Overall length, e.g., 1 word not including header) |
| Word 2 | (c)—Service header, service number 6 (Qualitative) |
| | (d)—Length of qualitative data, 0 words not including per-service header |

The value of 6 in the per-service header (field (c)), indicates that Service Type Qualitative is being requested.

Because the FLOWSPEC object 108 identifies the message as qualitative, PEPs along the return route may intercept the return message $106_1$ and apply admission control on the return path based on qualitative considerations. If admitted, PEPs may allocate specific resources to the relevant traffic flow at this time, but normally PEPs do not for qualitative messages. Instead, it is ordinarily a significantly better use of network resources to assign the traffic flow to an aggregate traffic handling mechanism.

One aggregate traffic handling mechanism by which network elements may apply QoS policy is Differentiated Services (diff-serv). Diff-serv is an aggregate traffic handling mechanism that uses the type-of-service (TOS) field in IP headers of packets to classify packets and apply specific queuing or scheduling behavior based on the results of the classification. Unlike Intserv, which uses very fine-grain classification to identify (a practically unlimited number of) individual flows, diff-serv classifies to a limited number of QoS 'behaviors.' To this end, diff-serv defines a set of per-hop-behaviors (PHBs) which are supported by diff-serv capable routers. PHBs define a behavior that is to be applied to packets passing through the router. Individual flows are thus aggregated into the smaller set of behaviors, whereby diff-serv alleviates the per-flow work associated with Intserv, and also eliminates the overhead associated therewith, including the significant and expensive state maintained on network devices to support installed RSVP/Intserv reservations.

To specify the PHB that is to be applied to the packet, a subset of the IP header's TOS field is named the DS-field, and packets in the diff-serv network carry a code in this field that specifies the PHB that is to be applied to the packet. Routers process packets as they arrive, directing them to the appropriate queue, per the PHB code in the packet's header. For example, one PHB is the expedited-forwarding (EF) PHB. This behavior is defined to assure that packets are transmitted from ingress to egress at some limited rate, with very low latency. Other behaviors may specify that packets are to be given a certain priority relative to other packets, in terms of average throughput or in terms of drop preference, but with no particular emphasis on latency. Typically, but not necessarily, PHBs are supported by different queues within the router/switch.

As a result, routers within the diff-serv network essentially need not store any flow/RSVP state. Instead, nodes are typically provisioned to classify (using TOS bits) arriving packets to some small number of behavior aggregates (e.g., high, medium or low priority) and to treat them accordingly. This provisioning tends to be 'open-loop' in the sense that there is no signaling between hosts and the network. Instead, the network administrator uses a combination of heuristics, measurement and experience to provision the network devices, with no deterministic knowledge of the volume of traffic that will arrive at any specific node. To this extent, Diff-serv QoS mechanisms are better suited for qualitative applications than traditional RSVP mechanisms. By way of example, a transaction processing application such as SAP tends to generate sporadic bursts of traffic that are difficult to quantify in a manner that is useful for admission control. Using the present invention, the request message is advertised as qualitative and also provides a user ID, application ID and sub-application ID. Based on this information, an RSVP-aware device may distinguish this SAP-related request message from other messages and thereby grant or deny resources based on policy information. Thus, in applying diff-serv mechanisms to manage qualitative traffic, network administrators need to anticipate the volume of traffic likely to arrive at each network node for each diff-serv behavior aggregate and provision accordingly. If the volume of traffic arriving is likely to exceed the capacity available for the behavior aggregate claimed, the network administrator has the choice of increasing the capacity for the behavior aggregate, reducing the volume of traffic claiming the behavior aggregate using admission control, or compromising service to all traffic arriving for the behavior aggregate.

In addition to provisioning, network administrators also need to deal with the classification, i.e., the policy that determines the code for marking each packet's IP header. Note that classifying based on other fields in the packet's IP header (i.e., source/destination address/port and protocol), referred to as MF classification, may be less efficient due to changing information over time, and imposes a management burden.

In diff-serv, to mark the packets, a DCLASS object 120 (FIG. 3) is appended to the RSVP return message $106_2$ to be returned to a sending host 92. The DCLASS object 120 includes a diff-serv codepoint (DSCP) 122 that the sender 92 should include when submitting packets on the admitted flow to the diff-serv network 88. For example, the DSCP 122 may indicate whether the packets should be queued in high, medium or low priority queues, among other possible classifications.

Figure 8:
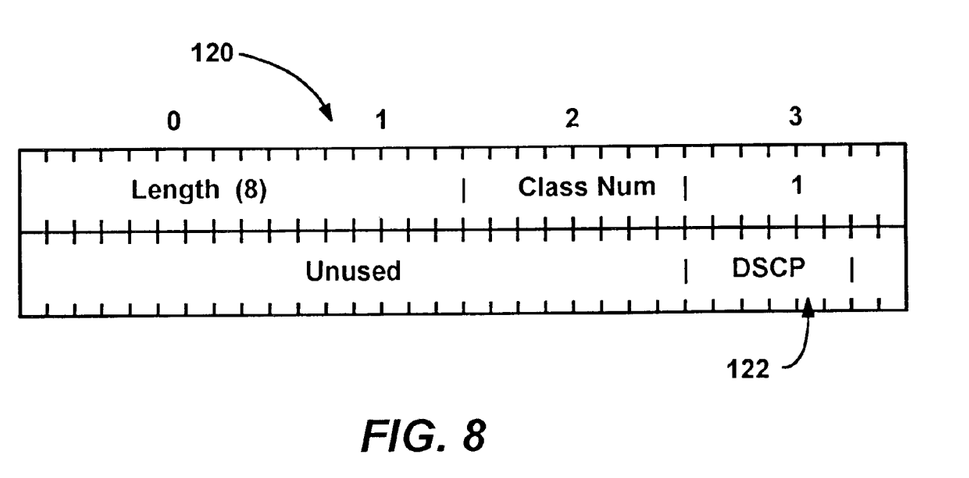
FIG. 8 is representation of a data structure for a DCLASS object suitable for adding to an RSVP message in accordance with one aspect of the present invention.

The DCLASS object 120 is formatted as shown in FIG. 8. At present, only six bits of the DCLASS field, i.e., the DSCP 122, are meaningful for aggregation/classification. Note that to provide backward compatibility, the Class-Num for the DCLASS object 120 is chosen from the space of unknown class objects that should be ignored and forwarded by RSVP nodes that do not recognize it.

To add the DCLASS object 120, as the return message $106_1$ arrives at the PEPs (e.g., 98) and/or other admission control agents (e.g., 97) that are RSVP enabled, each of these network elements makes a decision regarding the admissibility of the signaled flow to the diff-serv network 88. If a network element (e.g., 98) determines that the request is admissible to the network 88, the network element may decide which diff-serv service level (or behavior aggregate) is appropriate for the traffic represented in the RSVP request. For example, as shown in FIG. 3, the element 98 adds the DCLASS object 120 including the DSCP 122 with an appropriate value for the behavior aggregate, to a modified (appended) return message $106_2$. The appended return message $106_2$ is then sent towards the RSVP sender 92. Note that in order to decide whether a given RSVP request is admissible in terms of resource availability, one or more network elements within or at the boundary of the diff-serv network needs to understand the impact that admission control would have on specific diff-serv resources, as well as the availability of these resources along the relevant data path in the diff-serv network. In order to decide whether the RSVP request is admissible in terms of policy, the network element may use identity objects describing users and/or applications that may be included in the request. As described above, the router 98 may act as a PEP/PDP, and use data from a policy database 124, directory or the like to aid in this admission control decision.

Admission control in routers thus may use quite sophisticated mechanisms in making the admission control decision, including policy considerations, various intra-domain signaling protocols, results of traffic monitoring and so on. Diff-serv thus allows PEP/PDPs to affect the volume of traffic arriving at a node for any given behavior aggregate, and enables the PEP/PDP to do so based on possibly sophisticated policies. Note that a network element may terminate RSVP signaling in either direction, in which event it effectively provides admission control to all regions of the network (including the receiver 104). If the network element determines that the RSVP request is not admissible, it returns an error message, in which event no DCLASS object is provided to the sender.

By adding a DCLASS object to a returned RSVP RESV message, applications can benefit from quality of service by offering to insert the flow into an aggregate traffic handling class. At the same time, via classification according to the differentiated services code point, much of the overhead associated with RSVP signaling is eliminated. If a DCLASS object is returned, it notifies the sending host operating system of the appropriate DSCP mark to be applied to the packets transmitted on the traffic flow. Subsequent packets transmitted on the relevant traffic flow are marked with the appropriate DSCP by the sender's operating system. This enables intermediate diff-serv network devices to prioritize the packets according to their DSCP. Note however that packets that do not have an associated DSCP when coming into a network node may be marked by that node with an appropriate DCSP mark, although senders should refrain from marking traffic corresponding to rejected conversations. Moreover, note that upstream nodes may modify a DSCP received with a packet, e.g., to override the DSCP as needed. Thus, for example, an upstream sender may mark a packet with a lesser (e.g., corresponding to a lower priority) DSCP, or refrain from sending traffic on the conversation altogether.

Assuming that the flow was admitted, once marked, network devices are prepared to handle traffic on the relevant flow. Network devices may recognize the admitted flow specifically by the classification information provided or alternatively, by the DSCP in transmitted packets. The network devices now apply traffic handling mechanisms (in the form of PHBs) to guarantee appropriate QoS for the traffic flows.

Note that qualitative service does not preclude applications from offering both a quantitative service type and qualitative service type at the same time. For example, a telephony application may benefit from a quantitative service, but may be able to adapt to a qualitative service. By advertising both, such an application is primarily requesting installation of a reservation based on its quantitative parameters, but rather than simply denying a non-admissible quantitative request, the network should secondarily attempt to admit the request via its qualitative parameters. Note that for an application advertising its support for both, network policy still decides which service type to provide.

Figure 9:
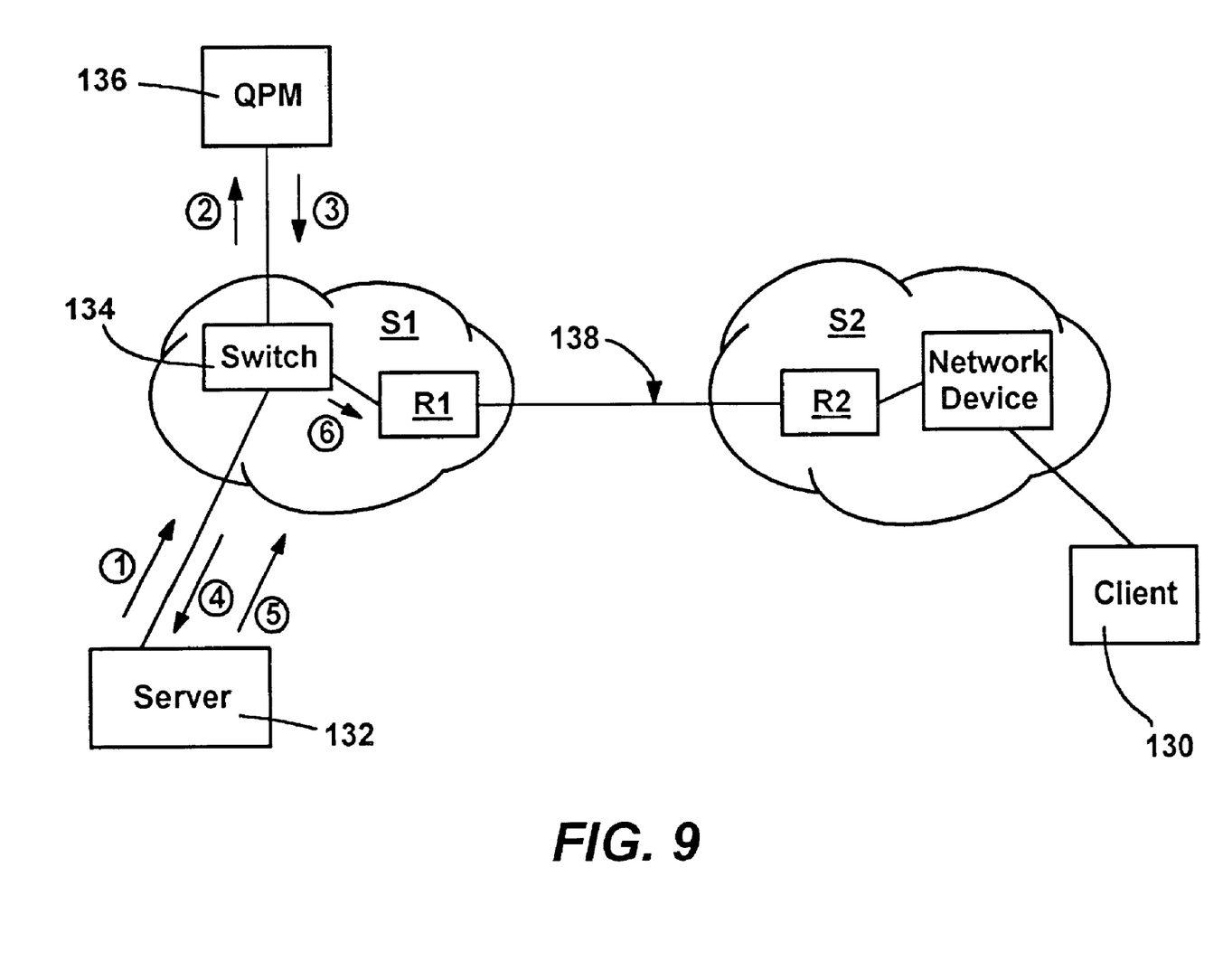
FIG. 9 is a block diagram generally representing an exemplary RSVP/diff-serv network in operation for qualitative signaling.

FIG. 9 shows an example of an RSVP/diff-serv network operating with a qualitative application such as SAP. In FIG. 9, the (SAP) client 130 has initiated a transaction with the SAP server 132. A TCP connection is established.

The SAP server 132 sends out an RSVP PATH message, represented in FIG. 9 via the arrow labeled with numeral one (1). For example, the PATH message may include information specifying that the service type equals "Qualitative" service, the application identifier equals "SAP-R3" and the sub application identifier equals "SAP-R3-GATEWAY."

The switch 134 in subnet S1 (e.g., an Intserv network) intercepts the PATH message and hands it to a QOS Policy Manager (QPM) 136, i.e., a PDP, as represented by the arrow labeled two (2). The QPM 136 looks up policy that determines an appropriate DSCP corresponding to the message's application and sub application identifiers. For this message, the QPM 136 looks for policy matching the application identifier ("SAP-R3") and the sub application identifier ("SAP-R3-GATEWAY"). The QPM 136 returns the result of the policy evaluation to the switch 134, as represented in FIG. 9 by the arrow labeled three (3).

If a match is found, a RESV message is generated in the switch 134 and sent back to the SAP server 132, as represented in FIG. 9 by the arrow labeled four (4). The RESV message includes a DCLASS object that specifies the DSCP, e.g., a DSCP corresponding to SAP and/or the sub application identifier. When the RESV message arrives at the SAP server 132, the server's operating system extracts the DSCP from the DCLASS object of the RESV message, and starts marking the traffic on that flow with this DSCP.

SAP traffic marked with this DSCP enters Router R1, as represented in FIG. 9 by the arrows labeled five (5) and six (6). Via the DSCP, the Router R1 may prioritize this traffic above best effort traffic over the link 138 to Subnet S2, e.g., a Diffserv network.

As can be seen from the foregoing detailed description, there is provided a method and system via which qualitative applications may benefit from network quality of service. RSVP signaling may be used to communicate qualitative information including sub-application flow identifiers that provide fine-grained qualitative information. Diff-serv may be used with RSVP to classify RSVP requests for aggregate traffic handling.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method of managing network traffic in a quality of service (QoS) enabled network, wherein quality of service is based on one or more qualitative factors, the method comprising,
   determining that the QoS enabled network is configured to transmit and receive network messages using a resource reservation protocol;
   extending the resource reservation protocol to include, for each data transmission request, qualitative information including the type of service requested, an application identifier, and the identity of a sub flow of the identified application;
   receiving a data transmission request for network resources via the resource reservation protocol from a software application that is unable to quantify resource reservations as a result of characteristically short data transmission bursts, the request including a DCLASS object including information identifying an application;
   evaluating the information identifying the application against policy information; and
   determining access to network resources based on a result of the evaluation.

2. The method of claim 1 wherein the information identifying the application includes an application identifier.

3. The method of claim 1 wherein the signaling protocol comprises RSVP.

4. The method of claim 1 wherein determining access to network resources based on a result of the evaluation includes admitting or denying the request.

5. The method of claim 1 wherein determining access to network resources based on a result of the evaluation includes returning marking information in response to the request.

6. The method of claim 5 wherein the marking information represents a relative priority level.

7. The method of claim 5 wherein the marking information includes a differentiated services codepoint.

8. The method of claim 5 wherein returning marking information includes providing a DCLASS object.

9. The method of claim 5 wherein the DCLASS object includes a differentiated services codepoint.

10. The method of claim 1 wherein the request farther includes quantitative information.

11. A computer-readable medium having computer executable instructions for performing the method of claim 1.

12. The method of claim 1, wherein the qualitative information comprises a DCLASS object.

13. A method of requesting network resources in a quality of service (QoS) enabled network, wherein quality of service is based on one or more qualitative factors, the method, comprising:
   determining that the QoS enabled network is configured to transmit and receive network messages using a resource reservation protocol;
   extending the resource reservation protocol to include, for each data transmission request message, qualitative information including the type of service requested, an application identifier, and the identity of a sub flow of the identified application;
   constructing a data transmission request message in accordance with the resource reservation protocol from a software application that is unable to quantify resource reservations as a result of characteristically short data transmission bursts, the request message including a DCLASS object including information identifying a type thereof as qualitative;
   sending the request message to request network resources, the request message passing through at least one network device that evaluates the qualitative information in the request message to determine access to network resources; and
   determining access to network resources based on a result of the evaluation.

14. The method of claim 13 further comprising, receiving a return message.

15. The method of claim 13 wherein the signaling protocol comprises RSVP.

16. The method of claim 13 wherein the qualitative information has an associated hierarchy.

17. The method of claim 13 wherein determining access to network resources based on a result of the evaluation includes admitting or denying the request.

18. The method of claim 13 further comprising, receiving a return message indicating that access to the requested resources is denied.

19. The method of claim 13 further comprising, receiving a return message including marking information.

20. The method of claim 19 wherein the marking 5 information represents a relative priority level.

21. The method of claim 19 wherein the marking information includes a differentiated services codepoint.

22. The method of claim 19 wherein returning marking information includes providing a DCLASS object.

23. The method of claim 22 wherein the DCLASS object includes a differentiated services codepoint.

24. The method of claim 19 further comprising, attaching the marking information to subsequent flow.

25. The method of claim 13 wherein the request message is sent towards a receiver.

26. A computer-readable medium having computer executable instructions for performing the method of claim 13.

27. A method of managing network traffic in a quality of service (QoS) enabled network, wherein quality of service is based on one or more qualitative factors, the method comprising:
   determining that the QoS enabled network is configured to transmit and receive network messages using a resource reservation protocol;
   extending the resource reservation protocol to include, for each data transmission request, qualitative information including the type of service requested, an application identifier, and the identity of a sub flow of the identified application;
   receiving a data transmission request for network resources via the resource reservation protocol from a software application that is unable to quantify resource reservations as a result of characteristically short data transmission bursts, the request including a DCLASS object including qualitative information;
   evaluating the qualitative information in the request against policy information;
   returning information based on a result of the evaluation including information that specifies to an upstream sender how to mark packets for classification thereof; and
   determining access to network resources based on a result of the evaluation.

28. The method of claim 27 wherein the information in the request further includes quantitative information.

29. The method of claim 27 wherein the qualitative information in the request includes an application identifier.

30. The method of claim 27 wherein the request comprises an RSVP PATH message.

31. A computer-readable medium having computer-executable instructions for performing the method of claim 21.

32. In a computer network, a system for providing quality of service via a signaling protocol, comprising:
- a sender, the sender determining that a QoS enabled network is configured to transmit and receive network messages using a resource reservation protocol, extending the resource reservation protocol to include, for each data transmission request, qualitative information including the type of service requested, an application identifier, and the identity of a sub flow of the identified application and providing a message comprising qualitative information therein including information identifying an application;
- a receiver, the receiver receiving the message from the sender, the message including a data transmission request for network resources via the resource reservation protocol from a software application that is unable to quantify resource reservations as a result of characteristically short data transmission bursts, and providing a return message including a DCLASS object in response thereto; and
- a policy enforcement device, the policy enforcement device evaluating at least one of the messages communicated between the sender and the receiver, and determining access to resources based on a result of the evaluation.

33. The system of claim 32 wherein the information identifying the application includes an application identifier.

34. The system of claim 32 wherein the policy enforcement device includes a router.

35. The system of claim 32 wherein the policy enforcement device includes a switch.

36. The system of claim 32 wherein the signaling protocol comprises RSVP.

37. The system of claim 32 wherein the policy enforcement device determines access to resources by adding marking information to the return message.

38. The method of claim 37 wherein the marking information represents a relative priority level.

39. The system of claim 37 wherein the marking information includes a differentiated services codepoint.

40. The system of claim 37 wherein the marking information includes a DCLASS object.

41. The system of claim 40 wherein the 15 DCLASS object includes a differentiated services codepoint.

42. A method of managing network traffic in a quality of service (QoS) enabled network, wherein quality of service is based on one or more qualitative factors, the method comprising,
- determining that the QoS enabled network is configured to transmit and receive network messages using a resource reservation protocol;
- extending the resource reservation protocol to include, for each data transmission request, qualitative information including the type of service requested, an application identifier, and the identity of a sub flow of the identified application;
- receiving a data transmission request for network resources via the resource reservation protocol from a software application that is unable to quantify resource reservations as a result of characteristically short data transmission bursts, the request including a DCLASS object including qualitative information;
- evaluating the qualitative information in the request against policy information;
- returning information based on a result of the evaluation including information that specifies to an upstream sender how to mark packets for classification thereof; and
- determining access to network resources based on a result of the evaluation.

\* \* \* \* \*